(12) United States Patent
Clayton et al.

(10) Patent No.: US 6,628,022 B2
(45) Date of Patent: Sep. 30, 2003

(54) POWER GENERATOR SYSTEM HAVING DIODE SUPPORT AND RUPTURE CONTAINMENT DEVICE AND ASSOCIATED METHODS

(75) Inventors: Peter Jon Clayton, Casselberry, FL (US); Joseph David Hurley, Casselberry, FL (US); Dennis Reed Seeley, Oviedo, FL (US); Thomas Leonard Schuchart, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 2 days.

(21) Appl. No.: 09/780,957

(22) Filed: Feb. 9, 2001

(65) Prior Publication Data

US 2002/0113504 A1 Aug. 22, 2002

(51) Int. Cl.[7] .................................................. H02K 7/00
(52) U.S. Cl. ........................ 310/68 D; 310/85; 310/42
(58) Field of Search ............................. 310/68 D, 67 R, 310/89, 64, 66, 42, 68 R, 85, 88; 361/141, 142, 806; 257/109, 471, 367, 288, 678, 690, 685, 686, 701, 704, 706, 707, 723, 725, 726, 683; 363/37, 52, 53

(56) References Cited

U.S. PATENT DOCUMENTS

| | | | |
|---|---|---|---|
| 3,836,837 A | 9/1974 | Rauhut | 321/55 |
| 3,896,320 A | 7/1975 | Moffatt | 310/64 |
| 4,164,705 A | 8/1979 | Whitney et al. | 324/158 |
| 4,223,263 A | 9/1980 | Hansen, Jr. et al. | 322/47 |
| 4,350,861 A | 9/1982 | Pouillange et al. | 219/10.61 |
| 4,603,344 A * | 7/1986 | Trommer | 165/80.4 |
| 4,621,210 A | 11/1986 | Krinickas, Jr. | 310/61 |
| 4,628,219 A | 12/1986 | Troscinski | 310/68 |
| 4,745,315 A | 5/1988 | Terry et al. | 310/68 |
| 4,794,510 A | 12/1988 | Wege | 363/145 |
| 4,827,165 A * | 5/1989 | Nold | 29/598 |
| 4,896,062 A * | 1/1990 | Pollard | 310/68 D |
| 5,003,209 A * | 3/1991 | Huss et al. | 310/68 D |
| 5,093,597 A | 3/1992 | Hughes | 310/209 |
| 5,164,624 A * | 11/1992 | Desai et al. | 257/712 |
| 5,191,248 A | 3/1993 | Huss | 310/68 |
| 5,191,254 A | 3/1993 | Raad et al. | 310/112 |
| 5,633,550 A | 5/1997 | Meehan et al. | 310/346 |
| 5,991,184 A | 11/1999 | Russell et al. | 363/145 |
| 6,362,550 B1 * | 3/2002 | Ragaly | 310/112 |

* cited by examiner

Primary Examiner—Dang Le

(57) ABSTRACT

A power generator system (10) is provided having a power generator (15) and an exciter (20) for excitation of the power generator (15). The exciter (20) preferably includes a diode wheel (30). The diode wheel (30) has an a rotating support structure (31), a plurality of diodes (35) mounted to the rotating support structure (31), and a plurality of a diode support and rupture containment devices (40) each positioned adjacent a respective one of the plurality of diodes (35) to support the diode (35) and contain the diode (35) within the confines thereof in the event the diode ruptures. Each of the diode support and rupture containment devices (40) includes a pair of insulative spaced-apart containment members (42, 47) having the diode (35) positioned therebetween.

3 Claims, 4 Drawing Sheets

POWER GENERATOR SYSTEM HAVING DIODE SUPPORT AND RUPTURE CONTAINMENT DEVICE AND ASSOCIATED METHODS

FIELD OF THE INVENTION

This invention is related to the power generation industry and, more particularly, to the field of electrical power generators.

BACKGROUND OF THE INVENTION

In the power generation industry, power generators have an exciter positioned adjacent thereto to provide excitation to the power generators. These exciters conventionally include one or more high power diodes which each have two terminals and exhibit a nonlinear voltage-current characteristic. The diodes generally permit current to flow in one direction but inhibit current flow in the other direction. The diodes, for example, can be used to rectify voltage and to assist in the conversion of alternating current to direct current with the power generation system. Examples of such diodes in association with a brushless exciter can be seen in U.S. Pat. No. 5,093,597 by Hughes titled "Brushless Exciter Saturable Reactor Diode Snubber" and U.S. Pat. No. 4,745,315 by Terry, Jr. et al. titled "Brushless Exciter With Zero-Gravity Rectifier Assembly." Also, an example of a diode for a rotor can be seen in U.S. Pat. No. 5,191,248 by Huss titled "Connection For Rotating Diode Package."

Diodes within a power generation system, however, due to deterioration over time, sudden unanticipated voltage or other electrical conditions, or other system conditions can rupture or become otherwise damaged. During rupture or other damage conditions, diode material which forms portions of the diode can be ejected, sprayed, or otherwise be disbursed from the diode and cause problems within the power generation system (see, e.g., FIG. 4). These effects are particularly troublesome in conjunction with rotating rectifiers. For example, molten material attributed to the diode rupturing near a metal-electric junction can be ejected and cause phase-to-phase arcing within a system, e.g., when the diode is mounted to a diode wheel of a brushless exciter.

SUMMARY OF THE INVENTION

In view of the foregoing, the present invention advantageously provides a power generation system and associated methods having a diode support and rupture containment device for supporting a diode and containing diode material within the confines of the containment device which would otherwise be ejected, sprayed, or travel away from the diode and cause damage to the power generation system and other electrical devices in the vicinity. The present invention also advantageously provides an exciter, such as a brushless exciter, which has a diode support and rupture containment device associated therewith which contains molten material ejected from a diode within the confines of the device.

The present invention additionally provides a diode support and rupture containment device which easily mounts adjacent a diode so that access to the diode for inspection, cleaning, or other associated maintenance can be achieved, which has insulating qualities and strength to resist high temperature material being ejected or sprayed during diode rupture, and which prevents damage to other portions of a power generation system in the event a diode ruptures or is otherwise damaged. The diode support and rupture containment device is also advantageously relatively inexpensive, easily retrofitable within a power generation system, and provides support for the ceramic or insulative case of a high voltage diode. The present invention further provides methods of containing diode material, e.g., ejected molten material, in the event a diode ruptures or is otherwise damaged.

More particularly, a power generator system is provided having a power generator and an exciter for excitation of the power generator. The exciter preferably includes a diode wheel. The diode wheel has rotating support structure, a plurality of diodes mounted to the structure, and plurality of diode support and rupture containment devices each positioned adjacent a respective one of the plurality of diodes to support the diode and contain the diode within the confines thereof in the event the diode ruptures. Each of the diode support and rupture containment devices preferably includes a pair of spaced-apart containment members having the diode positioned therebetween.

Advantageously, each of the containment members is preferably formed of an insulating material and has a substantially annular shape to thereby define an insulative disc. The insulating material is preferably strong enough to resist the temperature of the molten material ejected from a diode such as when material contacts a metal-electric junction where the diode is connected. This containment, for example, advantageously prevents phase-to-phase arcing in diode mount assemblies such as in the diode wheels of brushless exciters.

The present invention also provides a method of containing material ejected from a diode of a power generation system. The method preferably includes pivotally connecting a rupture containment device to a diode mounting region and adjacent a diode of the power generation system. The rupture containment device includes at least one rupture containment member formed of an insulating material. The step of pivotally connecting the rupture containment device can advantageously include positioning at least one end of the at least one rupture containment member adjacent one end of the diode and positioning another end of the at least one rupture containment member adjacent another end of the diode. The at least one rupture containment member, for example, can advantageously include a pair of rupture containment members. Each of the rupture containment members preferably has a substantially annular shape so that the rupture containment member defines an insulative disc.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout.

Figure 1:
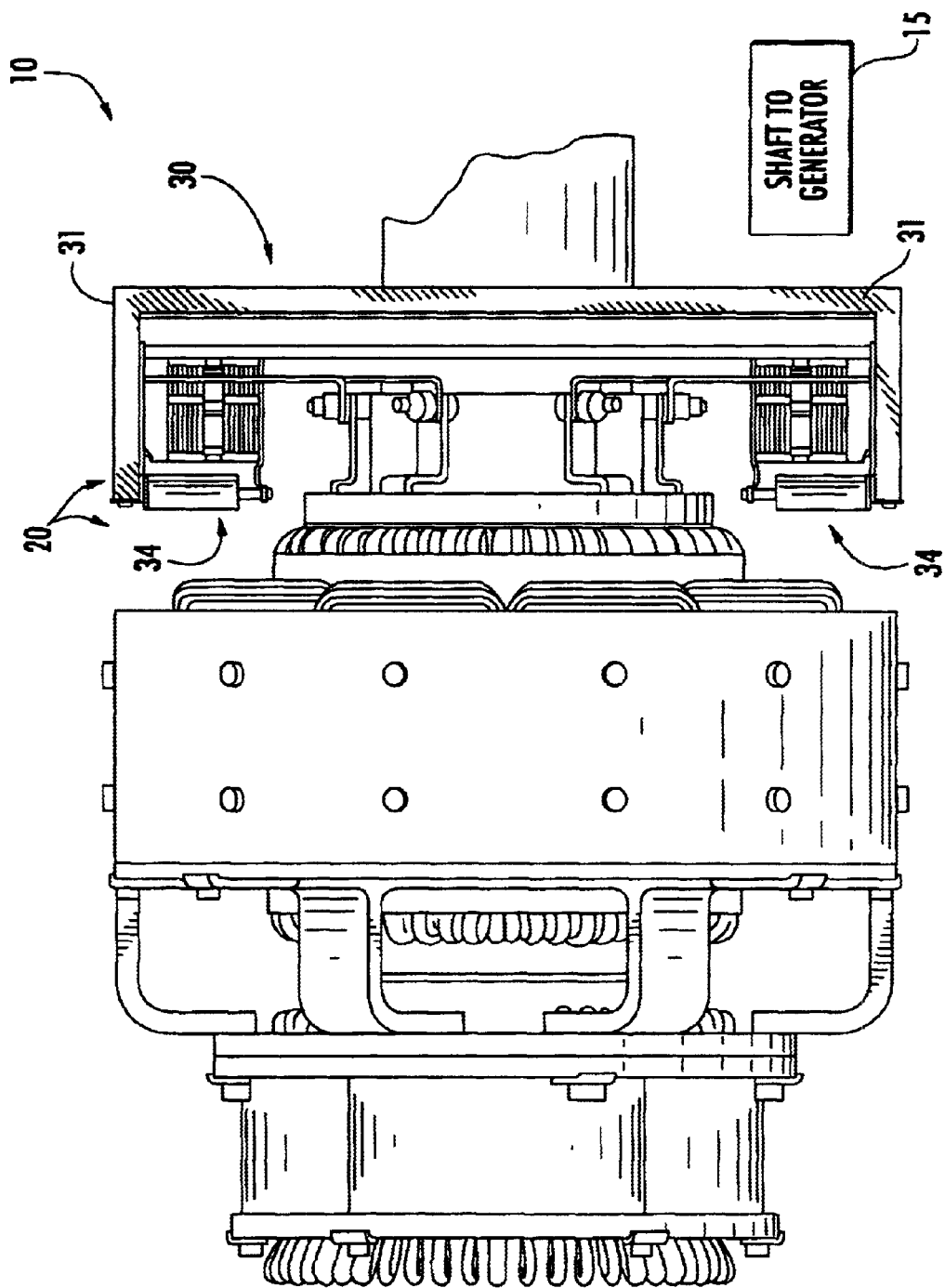
FIG. 1 is a side elevational view of a power generation system having an exciter and a diode support and rupture containment device according to the present invention.
Figure 2:
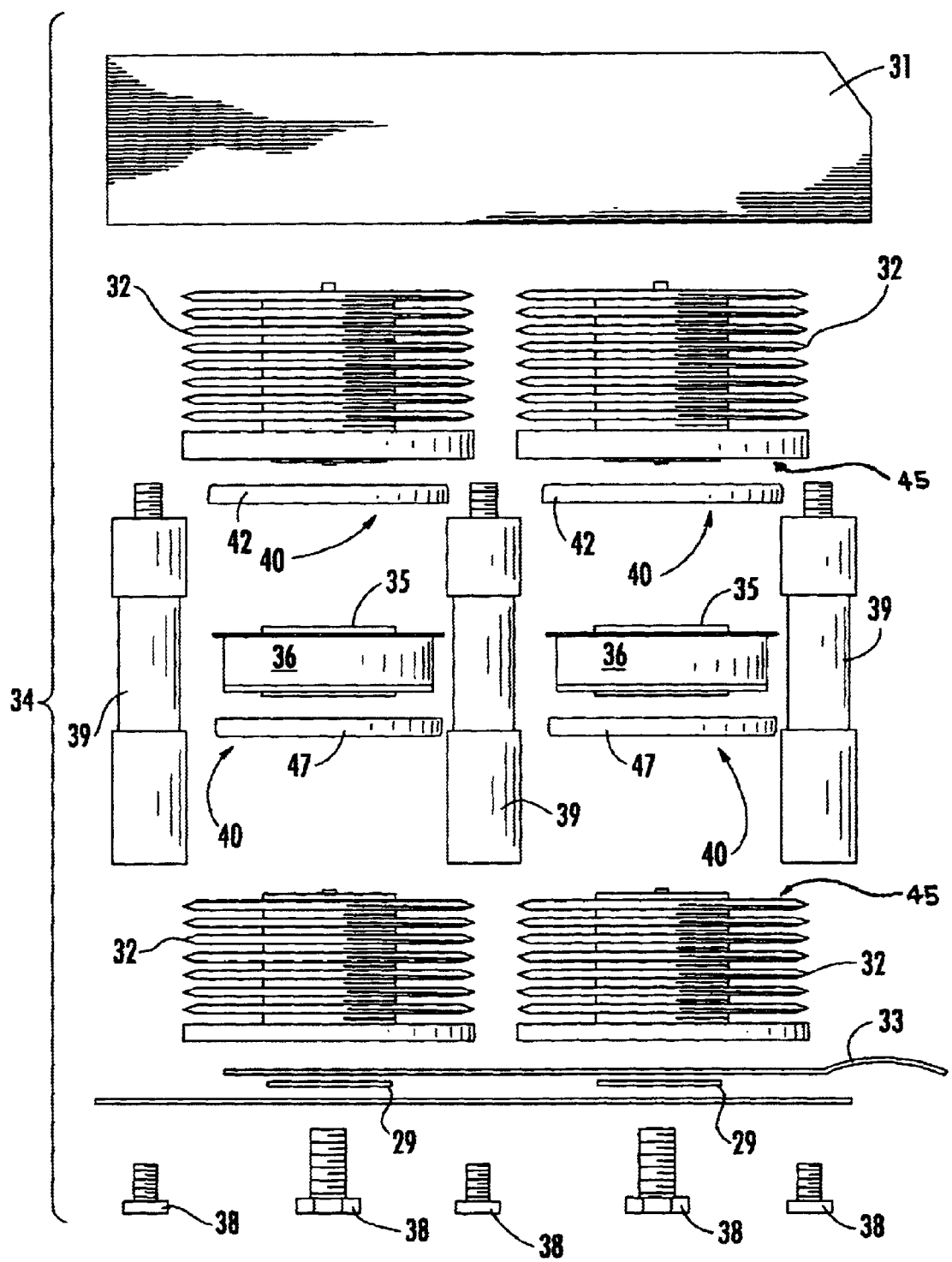
FIG. 2 is an exploded side elevational view of a diode support and rupture containment device positioned adjacent a diode according to the present invention.
Figure 3:
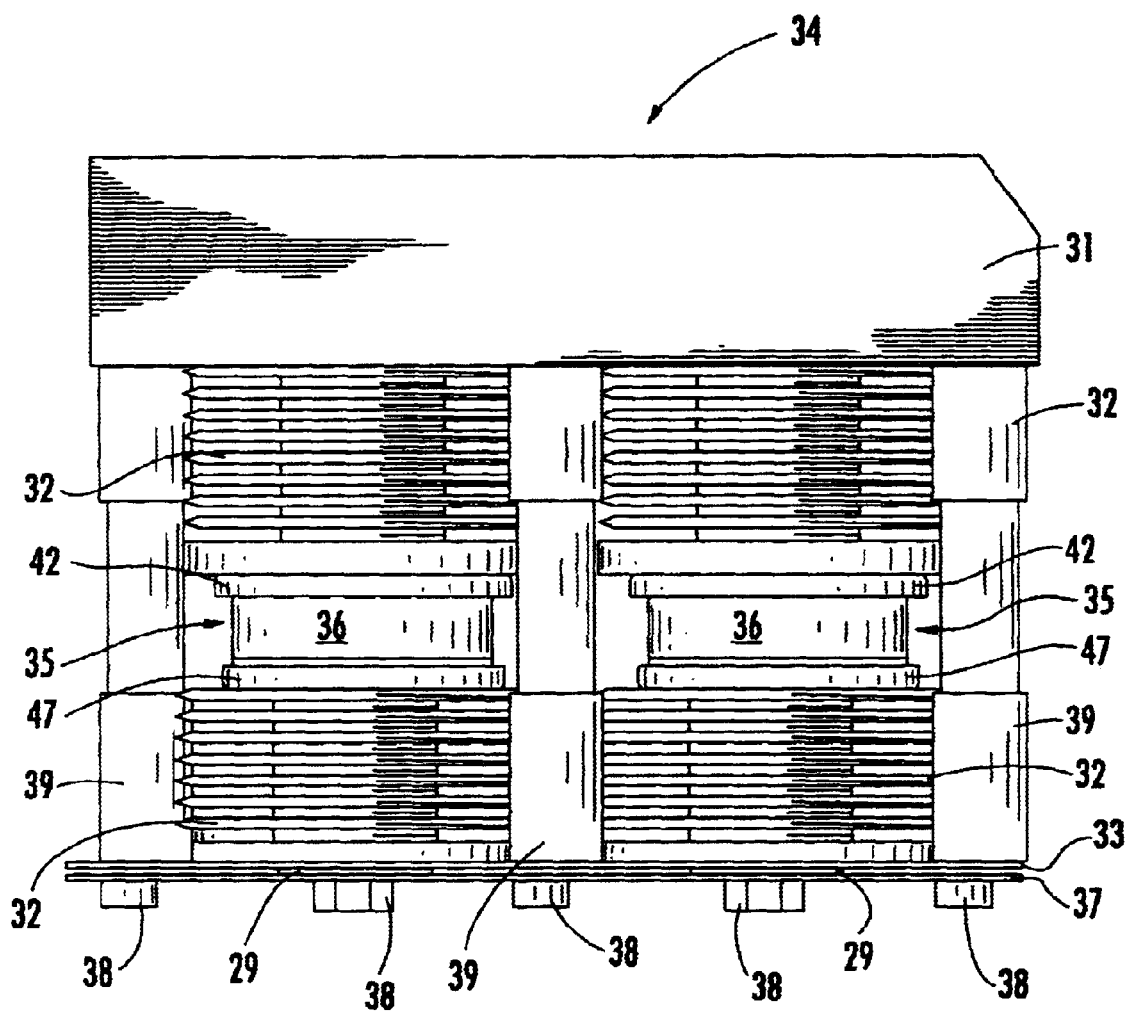
FIG. 3 is a side elevational view of a diode module having a pair of diode support and rupture containment devices each positioned adjacent one diode according to the present invention.
Figure 4:
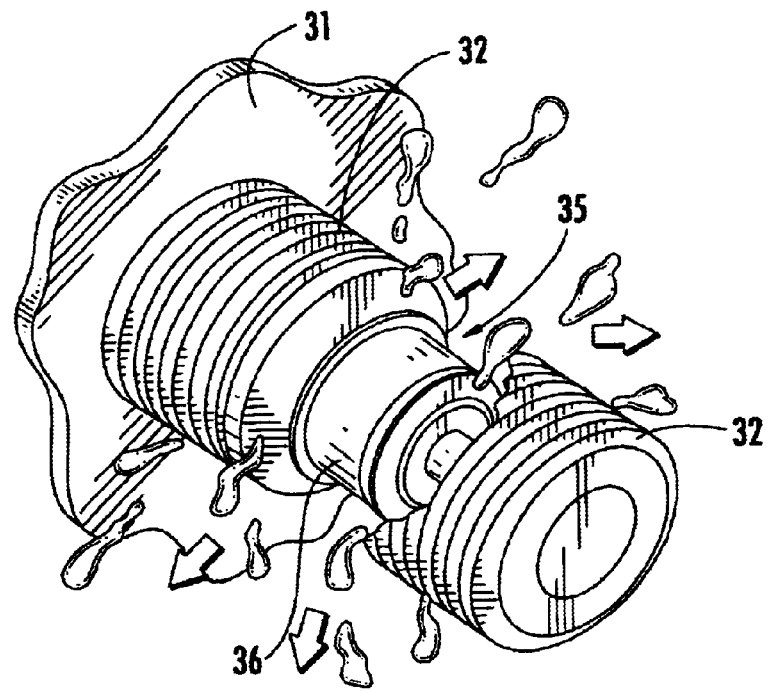
FIG. 4 is a perspective view of a diode without a diode support and rupture containment device during rupture of a diode according to the prior art.
Figure 5:
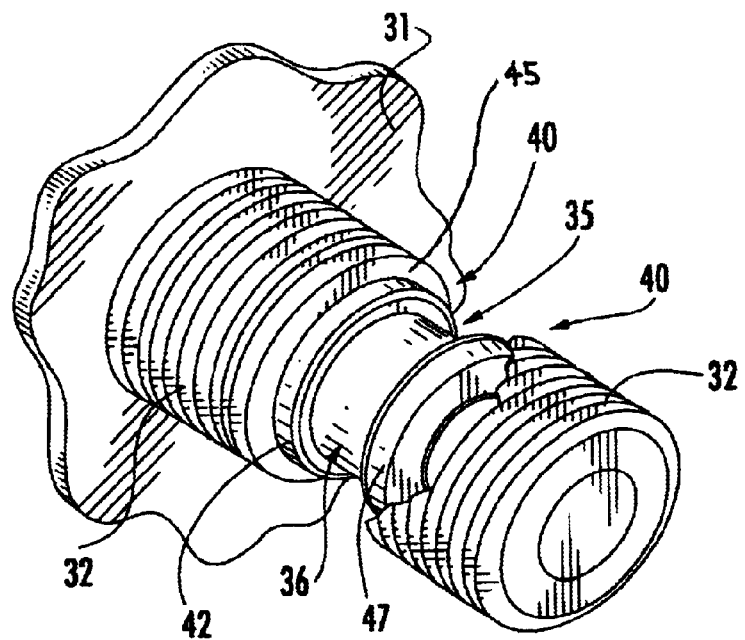
FIG. 5 is a perspective view of a diode support and rupture containment device containing molten material and other particulate within the confines thereof during rupture of a diode according to the present invention.

FIG. 1 illustrates a power generator system 10 having a power generator 15 and an exciter 20 for excitation of the power generator 15. It will be understood by those skilled in the art that the power generation system 10 can include two or more exciters as well. Each exciter 20, for example a brushless exciter, preferably includes a diode wheel 30. The diode wheel 30 has a rotating support structure 31, a plurality of diodes 35 mounted to the rotating support structure, e.g., in diode modules 34 (e.g., hockey puck shaped) as illustrated in FIGS. 2–3, and a plurality of a diode support and rupture containment devices 40 each positioned adjacent a respective one of the plurality of diodes 35 to support the diode 35 and contain diode material, e.g., molten material or other particulate, within the confines thereof in the event the diode 35 ruptures (see FIG. 5). The diode support and rupture containment device 40 also prevents the diode wheel 30 and other components of the diode wheel 30 from damage during such a rupture. The device 40 also advantageously provides support for the ceramic or other insulative case of the diode 35 to alleviate mechanical deformation at the diode junction that may occur, for example, due to centrifugal loading. Notably, FIG. 1 also illustrates other portions of a brushless exciter 20 as understood by those skilled in the art, but because the present invention focuses primarily on diode containment for brevity other portions of the exciter 20 are not described in detail further herein.

As illustrated in FIGS. 2–3, each of the diode support and rupture containment devices 40 preferably includes a pair of spaced-apart containment members 42, 47 having the diode 35 positioned therebetween. Each of the containment members 42, 47 is preferably formed of an insulating material and has a substantially annular shape to thereby define an insulative disc. Each of the containment members 42, 47 preferably are positioned to cover or encase only the end portions of the diode 35 where rupture containment and support are more needed as understood by those skilled in the art (see FIG. 5). The insulating material of each containment member 42, 47 is preferably strong enough to resist the temperature of the molten material ejected from a diode 35 such as when material contacts a metal-electric junction 45 where the diode 35 is connected, e.g., to or through a heat sink 32 to a lead member 33 and/or the rotating support structure 31 of the diode wheel 30. The heat sinks 32 and diodes 35 are preferably mounted in the module with heat sink support straps 37, bolts or other fasteners 38, stand-off insulators 39 and spacers 29 as understood by those skilled in the art. This containment, for example, advantageously prevents phase-to-phase arcing between diode mount assemblies.

Each of the discs 42, 47 of the diode support and rupture containment device 40 is preferably formed of a strong and durable insulating material. The insulative material preferably resists the temperature of molten material and prevents creep and strike from occurring near the electrical interface to the diode 35. The discs 42, 47 preferably mount with a slight clearance fit around the junction of the diode 35 and extend onto the ceramic or other insulative case of the diode 35 (also with a slight clearance fit). Because the device 40 extends down onto the ceramic case 36 of the diode 35, i.e., over the end portions thereof (see FIGS. 2–5) the device will contain all molten material ejected from the diode 35 or due to diode damage. The device 40 also will not interfere with the electrical connection and can be checked or inspected by rotating the device 40 to ensure it is not in hard contact with the diode 35 and the heatsink(s) 32 to which the diode 35 is often mounted. Rather, the device 40 is preferably pivotally or rotatably connected and each disc 42, 47 is preferably placed on each side of the diode 35.

As illustrated in FIGS. 1–5, the present invention also includes a method of containing material ejected from a diode 35 of a power generation system 10. The method preferably includes the step of connecting a rupture containment device 40 to a diode mounting region and adjacent a diode 35 of the power generation system 10. The diode rupture containment device 40 is preferably pivotally, and more preferably rotatably, connected to the diode mounting region where one end of the device 40 is positioned adjacent a metal-electric junction where the diode 35 is connected and another end adjacent another end of the diode casing 36. The rupture containment device 40 includes at least one rupture containment member 42, 47 formed of an insulating material. The step of connecting or pivotally connecting the rupture containment device 40 can advantageously include positioning at least one end of the at least one rupture containment member 42, 47 adjacent one end of the diode 35 and positioning another end of the at least one rupture containment member 42, 47 adjacent another end of the diode 35.

As described above, according to the method, the at least one rupture containment member 42, 47, for example, can advantageously include a pair of spaced-apart rupture containment members 42, 47. Each of the rupture containment members 42, 47 preferably has a substantially annular shape so that each of the rupture containment members 42, 47 defines an insulative disc Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

What is claimed is:

1. A power generator system comprising:

a power generator; and an exciter for excitation of said power generator, the exciter including a diode wheel, the diode wheel having a rotating support structure, a plurality of diodes mounted to the structure, and a plurality of a diode support and rupture containment devices each positioned adjacent a respective one of the plurality of diodes to support the diode and contain the diode within the confines thereof in the event the diode ruptures, each diode support and rupture containment device including a pair of spaced-apart insulative containment members with the respective diode positioned therebetween;

wherein the diode wheel includes a plurality of metal-electric connection regions each having one of the diodes connected thereto, wherein each of the plurality of diodes includes a casing formed of an insulating material, and wherein at least one of the pair of containment members is positioned adjacent the metal-electric connection region having the diode connected thereto and extends to the casing of the diode; and wherein each of the pair of containment members has a substantially annular shape to thereby define an insulative disc, and wherein each of the insulative discs are pivotally connected to the diode wheel for ease of access to the diode.

2. An exciter for a power generation system, the exciter comprising:

a rotating support structure;

a diode mounted to the structure; and a diode support and rupture containment device positioned to support the diode and contain the diode within the confines thereof in the event the diode ruptures, the diode support and rupture containment device including a pair of spaced-apart insulative containment members arranged to have a diode positioned therebetween, the diode including an insulative casing, each of the pair of insulative containment members positioned to extend from a metal-electric connection region when the diode is connected to a conducting member to the insulative casing of the diode;

wherein each of the pair of containment members has a substantially annular shape to thereby define an insulative disc.

3. A diode support and rupture containment device for a diode of a power generation system, the device comprising:

a pair of spaced-apart insulative containment members arranged to have a diode positioned therebetween, the diode including an insulative casing, each of the pair of insulative containment members positioned to extend from a metal-electric connection region when the diode is connected to a conducting member to the insulative casing of the diode;

wherein each of the pair of containment members has a substantially annular shape to thereby define an insulative disc.

* * * * *